(12) United States Patent
Wang

(10) Patent No.: US 8,832,592 B2
(45) Date of Patent: Sep. 9, 2014

(54) APPARATUS AND METHOD FOR LOADING APPLICATION OF PORTABLE DEVICE

(71) Applicant: Yin-Zhan Wang, Shenzhen (CN)

(72) Inventor: Yin-Zhan Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 43 days.

(21) Appl. No.: 13/652,520

(22) Filed: Oct. 16, 2012

(65) Prior Publication Data

US 2013/0275915 A1    Oct. 17, 2013

(30) Foreign Application Priority Data

Apr. 13, 2012    (CN) .......................... 2012 1 0108054

(51) Int. Cl.
*G06F 3/048*    (2013.01)
*G06F 3/0481*   (2013.01)

(52) U.S. Cl.
CPC ................................... *G06F 3/0481* (2013.01)
USPC .......................................... 715/788; 715/789

(58) Field of Classification Search
None
See application file for complete search history.

(56) References Cited

U.S. PATENT DOCUMENTS

| | | | |
|---|---|---|---|
| 8,237,942 B2* | 8/2012 | Iwashita | 358/1.13 |
| 2004/0043758 A1* | 3/2004 | Sorvari et al. | 455/414.1 |
| 2004/0068627 A1* | 4/2004 | Sechrest et al. | 711/158 |
| 2008/0177950 A1* | 7/2008 | Naruse et al. | 711/118 |
| 2008/0227440 A1* | 9/2008 | Settepalli | 455/418 |
| 2008/0263024 A1* | 10/2008 | Landschaft et al. | 707/5 |
| 2008/0313567 A1* | 12/2008 | Sabin et al. | 715/835 |
| 2011/0010244 A1* | 1/2011 | Hatridge et al. | 705/14.53 |
| 2011/0119628 A1* | 5/2011 | Carter et al. | 715/812 |
| 2011/0161852 A1* | 6/2011 | Vainio et al. | 715/769 |
| 2012/0036552 A1* | 2/2012 | Dare et al. | 726/1 |
| 2013/0205001 A1* | 8/2013 | Reed et al. | 709/224 |

* cited by examiner

*Primary Examiner* — Ryan Pitaro
*Assistant Examiner* — Maryam Ipakchi
(74) *Attorney, Agent, or Firm* — Novak Druce Connolly Bove + Quigg LLP

(57) ABSTRACT

In a computerized method for loading applications of a portable device, a usage frequency of each of the applications is counted during a time period when the portable device is in a power-on state. The applications that are installed in an external or embedded storage of the portable device are searched and the usage frequency of each of the applications is obtained, when the portable device is booted or rebooted. The applications are arranged in a sequence according to the usage frequency of each of the applications, and each of the applications is loaded from the external or embedded storage to a random access memory of the portable device in sequence according to an arrangement order of each application in the sequence.

14 Claims, 3 Drawing Sheets

APPARATUS AND METHOD FOR LOADING APPLICATION OF PORTABLE DEVICE

BACKGROUND

1. Technical Field

Embodiments of the present disclosure relate to application management technologies of portable devices, and particularly to a method for loading applications of a portable device.

2. Description of Related Art

Many applications may be installed in a portable device, such as a smart phone, a personal digital assistant, and a tablet computer, to satisfy different users requirements. Generally, most of the applications are installed in an external or embedded storage (e.g., a SD card) of the portable device. When the portable device is started or restarted, the applications may be randomly and automatically loaded from the external or embedded storage into a RAM of the portable device. Only when the applications are loaded into the RAM of the portable device can the user activate the applications. In some particular situations, if the user wants to immediately activate an often used application once the portable device is started, the application may not be available because the loading of the application has not been finished. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
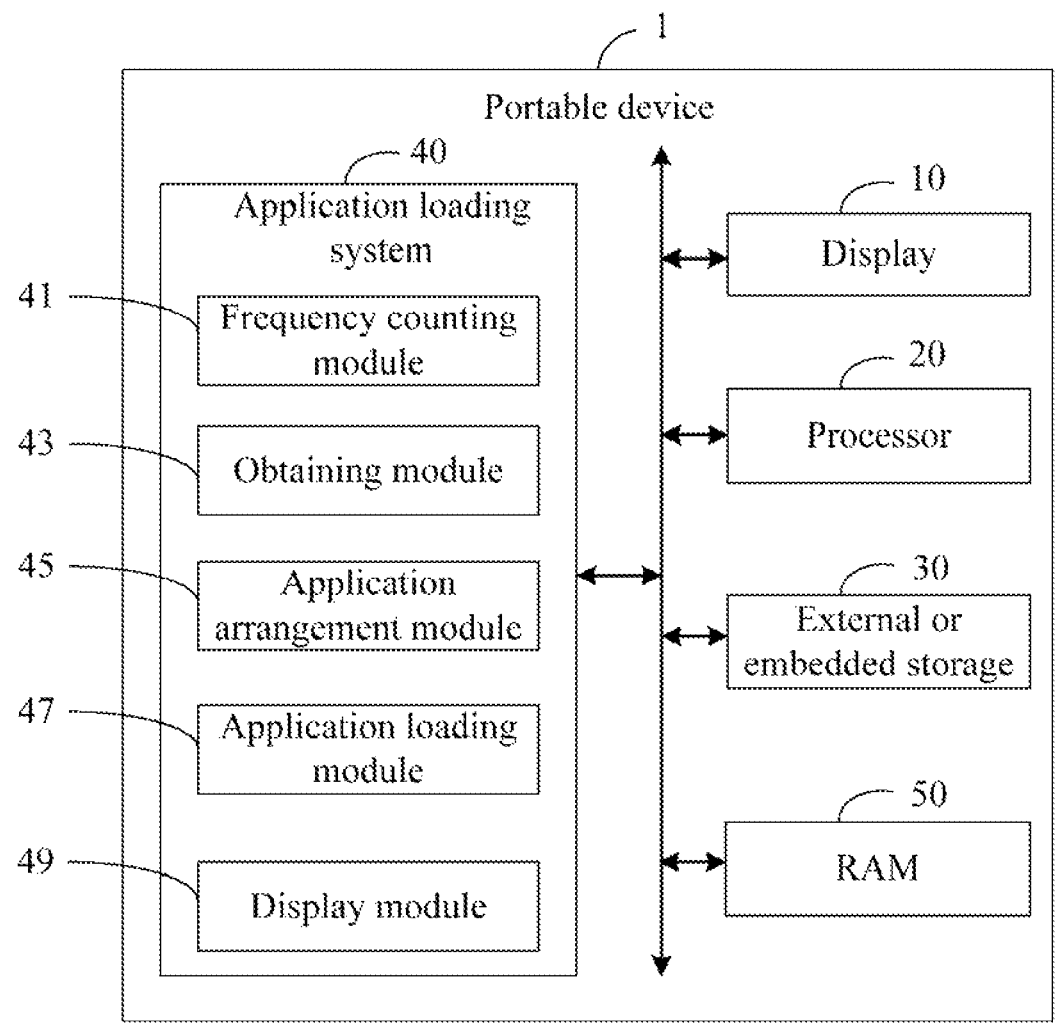
FIG. 1 is a schematic block diagram illustrating one embodiment of a portable device.

FIG. 1 is a schematic block diagram illustrating one embodiment of a portable device 1. The portable device 1 includes a display 10, a processor 20, an external or embedded storage 30, an application loading system 40, and a random access memory (RAM) 50. In the embodiment, a plurality of applications may be installed in the external or embedded storage 30. The external or embedded storage 30 may be, for example, a secure digital memory (SD) card, a Trans Flash (TF) card, a compact flash (CF) card, or a smart media (SM) card. The application loading system 40 controls loading of the applications from the external or embedded storage 30 to the RAM 50 when the portable device 1 is started or restarted. The portable device 1 may be, for example, a smart mobile phone, a mobile internet device, a tablet computer, or other similar mobile devices. FIG. 1 shows one example of the portable device 1, and the portable device 1 can include more or fewer components than those shown in the embodiment, or have a different configuration of the components.

The application loading system 40 may include a plurality of programs in the form of one or more computerized instructions executed by the processor 20 to perform operations of the portable device 1. In the embodiment, the application loading system 40 includes a frequency counting module 41, an obtaining module 43, an application arrangement module 45, an application loading module 47, and a display module 49. In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The frequency counting module 41 counts a usage frequency of each of the applications of the portable device 1 during a time period when the portable device 1 is in a power-on state. In the embodiment, the usage frequency of an application is defined as a number of times that the application is activated by a user within a predetermined time period, such as within the past 24 hours. The usage frequency of each of the applications may be stored in a predetermined table established in the external or embedded storage 30.

The obtaining module 43 searches the applications installed in the external or embedded storage 30 when the portable device 1 is booted or rebooted, and obtains the usage frequency of each of the applications.

The application arrangement module 45 arranges the applications in a sequence according to the usage frequency of each of the applications. In the embodiment, the applications in the sequence are arranged according to the usage frequency of each application in a descending order.

The application loading module 47 loads each of the applications from the external or embedded storage 30 to the RAM 50 in sequence according to an arrangement order of each application in the sequence.

Figure 2:
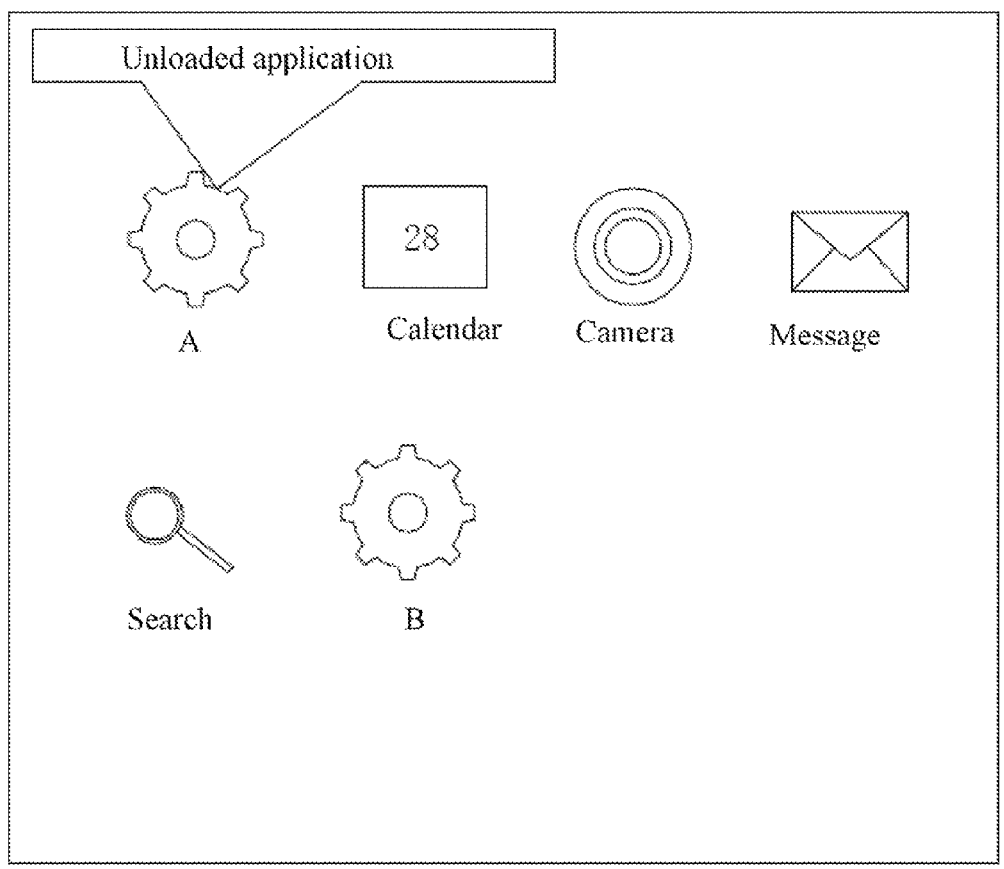
FIG. 2 is a schematic diagram of an example of a home screen of the portable device during loading applications of the portable device.

The display module 49 controls display of an icon of each of the applications on the display 10 during the loading of the applications. In the embodiment, when an application has not been loaded, a predetermined icon (e.g., a gear shaped icon of FIG. 2) may be displayed at a location where the icon of the application will be located to indicate that the application (e.g., application A or B of FIG. 2) has not been loaded. When the predetermined icon is clicked or touched by the user, the display module 49 displays a predetermined notification, such as "unloaded application" of FIG. 2, on the display 10, to notify the user that the selected application is in a loading status. When the application is successfully loaded, the predetermined icon is changed to the icon of the application.

Figure 3:
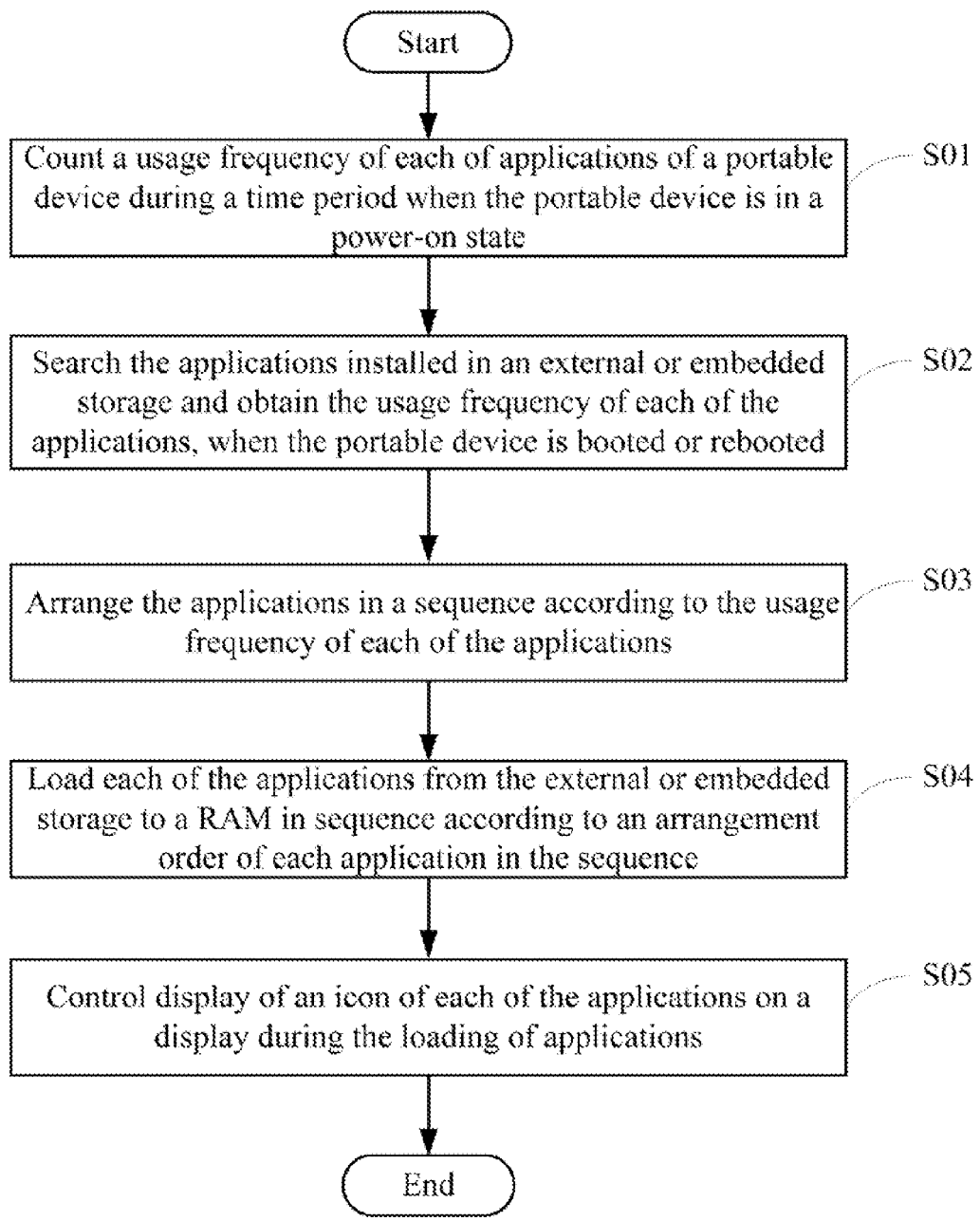
FIG. 3 is a flowchart of one embodiment of a method for loading applications of the portable device of FIG. 1.

FIG. 3 shows a flowchart of one embodiment of a method for loading applications of the portable device 1 of FIG. 1. Depending on the embodiment, additional steps may be added, others removed, and the ordering of the steps may be changed.

In step S01, the frequency counting module 41 counts a usage frequency of each of the applications of the portable device 1 during a time period when the portable device 1 is in a power-on state. In the embodiment, the usage frequency of each of the applications is stored in a predetermined table established in the external or embedded storage 30.

In step S02, when the portable device 1 is booted or rebooted, the obtaining module 43 searches the applications installed in the external or embedded storage 30 and obtains the usage frequency of each of the applications.

In step S03, the application arrangement module 45 arranges the applications in a sequence according to the usage frequency of each of the applications. In the embodiment, the applications in the sequence are arranged according to the usage frequency of each application in a descending order.

In step S04, the loading module 47 loads each of the applications from the external or embedded storage 30 to the RAM 50 in sequence according to an arrangement order of each application in the sequence.

In step S05, the display module 49 controls display of an icon of each of the applications on the display 10 during the loading of the applications.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for loading applications of a portable device, comprising:
    counting a usage frequency of each of the applications during a time period when the portable device is in a power-on state;
    searching the applications installed in an external or embedded storage of the portable device and obtaining the usage frequency of each of the applications, when the portable device is booting or rebooting;
    arranging the applications in a sequence according to the usage frequency of each of the applications; and
    loading each of the applications from the external or embedded storage to a random access memory of the portable device in sequence according to an arrangement order of each application in the sequence.

2. The method according to claim 1, wherein the usage frequency of each of the applications is stored in a predetermined table established in the external or embedded storage.

3. The method according to claim 1, wherein the applications in the sequence are arranged according to the usage frequency of each application in a descending order.

4. The method according to claim 1, wherein the usage frequency of each application is defined as a number of times that the application is activated by a user within a predetermined time period.

5. The method according to claim 1, further comprising:
    controlling display of an icon of each of the applications on a display of the portable device during the loading of the applications.

6. The method according to claim 5, wherein the controlling step comprises:
    displaying a predetermined icon at a location where an icon of an application will be located when the application has not been loaded; and
    changing the predetermined icon to the icon of the application when the application is successfully loaded.

7. The method according to claim 6, wherein the controlling step further comprises:
    displaying a predetermined notification on the display when the predetermined icon is clicked or touched by a user, to notify the user that the selected application is in a loading status.

8. A portable device, comprising:
    a random access memory;
    an external or embedded storage storing a plurality of applications;
    a processor; and
    one or more programs executed by the processor to perform a method for loading the applications, the method comprising:
    counting a usage frequency of each of the applications during a time period when the portable device is in a power-on state;
    searching the applications installed in the external or embedded storage and obtaining the usage frequency of each of the applications, when the portable device is booting or rebooting;
    arranging the applications in a sequence according to the usage frequency of each of the applications; and
    loading each of the applications from the external or embedded storage to a random access memory in sequence according to an arrangement order of each application in the sequence.

9. The portable device according to claim 8, wherein the usage frequency of each of the applications is stored in a predetermined table established in the external or embedded storage.

10. The portable device according to claim 8, wherein the applications in the sequence are arranged according to the usage frequency of each application in a descending order.

11. The portable device according to claim 8, wherein the usage frequency of each application is defined as a number of times that the application is activated by a user within a predetermined time period.

12. The portable device according to claim 8, wherein the method further comprises:
    controlling display of an icon of each of the applications on a display of the portable device during the loading of the applications.

13. The portable device according to claim 12, wherein the method further comprises: displaying a predetermined icon at a location where an icon of an application will be located when the application has not been loaded, and changing the predetermined icon to the icon of the application when the application is successfully loaded.

14. The portable device according to claim 13, wherein the method further comprises: displaying a predetermined notification on the display when the predetermined icon is clicked or touched by a user, to notify the user that the selected application is in a loading status.

* * * * *